Jan. 4, 1927.  J. R. THOMAS  1,613,144
HOE
Filed Nov. 14, 1925
Fig. 1.
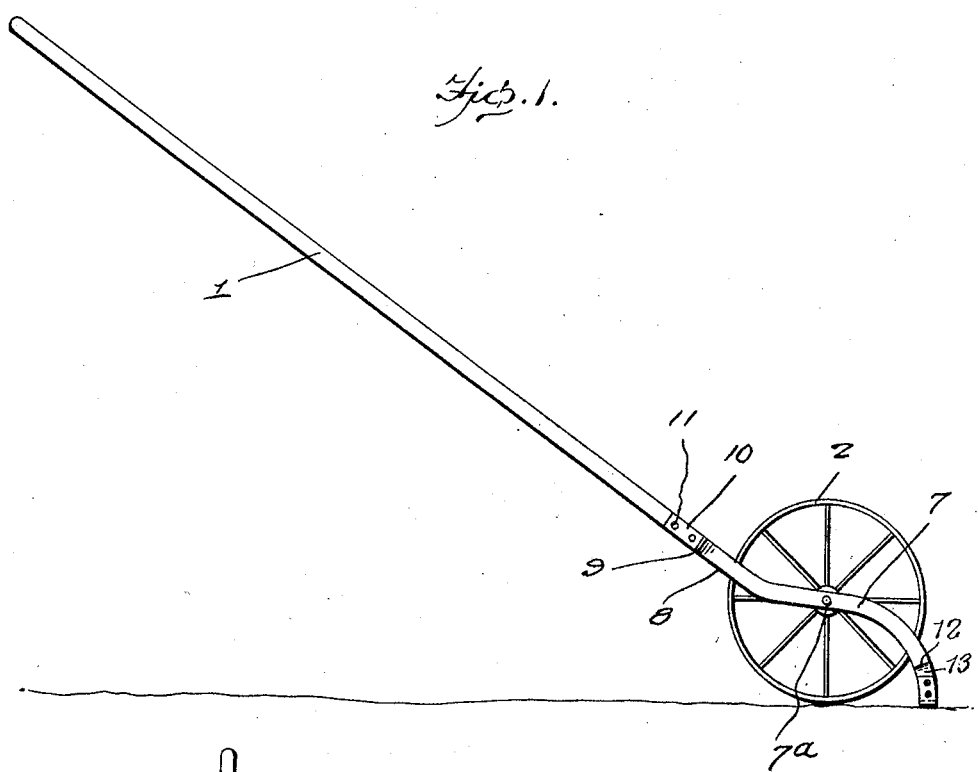
Fig. 2.
Fig. 3.
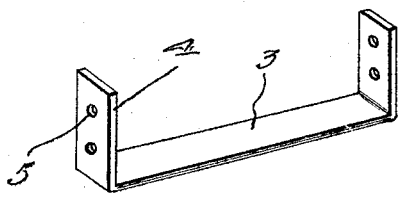
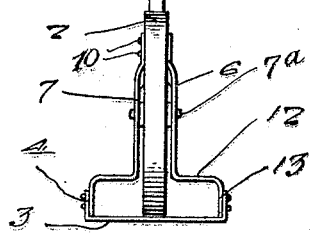
Inventor
J. R. Thomas
By Clarence A. O'Brien
Attorney Patented Jan. 4, 1927.

1,613,144

UNITED STATES PATENT OFFICE.

JUDSON R. THOMAS, OF HAMILTON, MONTANA.

HOE.

Application filed November 14, 1925. Serial No. 69,084.

My present invention pertains to hoes, and it has for its object to provide a hoe that is simple in construction and light in weight and is adapted to be wielded with but little effort on the part of the operator and used to advantage for general cultivation purposes, and particularly for cultivating small spreading plants and removing small weeds, the hoe also being advantageous because of its capacity to break the crust of the ground, and yet leave the surface smooth.

Other objects and practical advantages of the invention will be fully understood from the following description and claim when the same is read in connection with the drawings, accompanying and forming part of this specification, in which:—

Figure 1 is a side elevation of the hoe constituting the preferred embodiment of my invention.

Figure 2 is a front elevation of the hoe.

Figure 3 is an enlarged detail perspective showing the blade of the hoe.

Similar numerals of reference designate corresponding parts in all of the views of the drawings.

As illustrated the preferred embodiment of my invention comprises a wooden handle 1 and a ground wheel 2, said wheel 2 being preferably, though not necessarily, of appropriate metal. The hoe also includes a blade 3, which may be and preferably is of steel. At its ends the blade 3 is provided with angularly disposed arms 4, apertured at 5 for attachment to the shank portions 6, these latter portions being preferably of appropriate metal. By reference to Figures 1 and 2, it will be readily understood that the shank portions 6 have curvilinear portions 7 in front of the bearings 7ª of the wheel axle or trunnions, and also have portions 8 in rear of said axle bearings, the said portions 8 describing obtuse angles in side elevation and being merged into shoulders 9, which, in turn, are merged into parallel portions 11 apertured as shown and designed to be connected by bolts or rivets to the handle 1 as designated by 10. At their lower and forward ends the shank portions 7 are merged into lateral portions 12, and said portions 12 at their ends have pendent portions 13, and it is to these pendent portions 13 that the blade 3 is directly attached, the blade arms 4 being preferably arranged at the outer sides of the shank portions 13 and so that the extreme ends of the shank portions will bear against and reinforce the transverse major portion of the blade 3, thereby lending increased strength and rigidity to the construction.

By virtue of the construction of my novel hoe, the hoe apparently is capable of being efficiently manipulated with but very little effort on the part of the operator, and in the use of the hoe for cultivating small spreading plants or cutting out weeds, the major portion of the blade 3 may be moved along at such a height as to cultivate small plants and remove weeds and break up the crust of the ground in one and the same operation. Moreover by virtue of the relative arrangement of the elements shown in Figure 2, the wheel 2 will be capable of moving between spreading plants without injury thereto, while the blade 3 which is much greater in length than the width of the wheel 2 will reach under the plants for the breaking up of the ground adjacent to the plant stalks.

Notwithstanding the capacity of function ascribed in the foregoing to my novel hoe, it will be readily appreciated that the hoe is exceedingly simple and inexpensive in construction, and while light in weight is generally well adapted to withstand the usage and exposure to which hoes are ordinarily subjected.

The construction as specifically described and as illustrated in the drawings is for general purposes the best practical embbodiment of my invention of which I am cognizant. I do not desire, however, to be understood as confining myself to the specific construction and arrangement of parts as disclosed, my invention being defined by my appended claim within the scope of which modifications in structure and in relative arrangement of parts may be made without departure from my invention.

Having described my invention, what I claim and desire to secure by Letters Patent, is:—

A hoe comprising a handle, a ground wheel disposed in front of and in spaced relation to the handle, a blade of much greater length than the width of the ground wheel disposed transversely in front of said wheel and extending laterally in opposite directions from the vertical plane of the wheel and having angularly disposed upstanding arms, and shank portions disposed at opposite sides of and connected to the handle and receiving between them the ground wheel and interposed between and connected with the angular upstanding arms of the blade and abutting at their forward ends against the major portion of the blade to lend increased stiffness and strength thereto, the said shank portions including forwardly and downwardly extending arms in front of the center of movement of the wheel, outwardly directed lateral arms at the forward ends of the forwardly and downwardly extending arms and having pendent terminals in direct connection with the blade, and rearwardly and upwardly extending arms in rear of the center of movement of the wheel and directly connected to the handle.

In testimony whereof I affix my signature.

JUDSON R. THOMAS.